United States Patent [19]

Bibik, Jr.

[11] Patent Number: 4,892,137
[45] Date of Patent: Jan. 9, 1990

[54] BEVERAGE TEMPERATURE CONTROLLER FOR A VEHICLE

[76] Inventor: Frank F. Bibik, Jr., 7010 Sepulveda Blvd., #212, Van Nuys, Calif. 91405

[21] Appl. No.: 286,823

[22] Filed: Dec. 20, 1988

[51] Int. Cl.$^4$ .......................... B60H 1/32; B60H 1/12
[52] U.S. Cl. ................................... 165/80.1; 165/41; 62/244
[58] Field of Search .................. 165/41, 80.1; 62/239, 62/244; 220/85 H

[56] References Cited

U.S. PATENT DOCUMENTS

| | | | |
|---|---|---|---|
| 3,410,337 | 11/1968 | Priest | 165/41 |
| 3,505,830 | 4/1970 | Koerner | 62/337 |
| 3,757,851 | 9/1973 | Marble | 165/41 |
| 3,916,639 | 11/1975 | Atkinson | 62/239 |
| 4,163,374 | 8/1979 | Moore et al. | 62/457 |
| 4,312,465 | 1/1982 | Sinkhorn et al. | 224/36 |
| 4,478,052 | 10/1984 | McDowell | 62/244 |
| 4,653,289 | 3/1987 | Hodgetts | 62/239 |

Primary Examiner—Martin P. Schwadron
Assistant Examiner—Allen J. Flanigan
Attorney, Agent, or Firm—John J. Posta, Jr.

[57] ABSTRACT

The beverage temperature controller is adapted to be releasably connected to the vent(s) of a vehicle are temperature conditioning unit which may be a heater or an air cooling and heating unit. The controller includes a box-like hollow housing having a generally horizontal closed bottom, interconnected closed upraised sides, front and rear and an open top, which can be covered by an openable lid. The housing defines a control storage space accessible through the top and in which a ring-like beverage can or drink holder is secured, so that the beverage is spaced from the housing sides, front and back, allowing circulation of air therearound. Strips in the housing bottom also raise the can for additional circulation. The housing rear has an opening permitting air to flow from the vent(s) of a vehicle air temperature conditioning unit into the housing and around the beverage can, keeping it hot or cold, as desired, when the housing is releasably connected directly to the vent(s) or through a spacing adapter in the form of a sleeve. A spring biased hook, velcro straps, etc. can be used as housing-vent connectors. The front of the housing may include a grill to allow the air to exit the housing.

9 Claims, 3 Drawing Sheets

BEVERAGE TEMPERATURE CONTROLLER FOR A VEHICLE

BACKGROUND OF THE INVENTION

1. Field of the Invention

The present invention generally relates to beverage temperature regulators and more particularly to beverage temperature controllers in vehicles.

2. Prior Art

Many vehicle drivers and passengers enjoy drinking hot and cold beverages while motoring to business, on vacations, etc. Usually, the beverage is in a disposable can or cup and unless it is consumed rapidly it rather quickly reaches room temperature and becomes unpalatable. Certain expensive insulated beverage cups are on the market and are used for such purposes but once they are opened so that drinking can commence, they result in a rapid change in the beverage temperature towards ambient temperature and are not much improved over the disposable types of beverage containers.

There remains a need for a simple, inexpensive, durable and efficient device which will permit beverages when carried opened or unopened in a vehicle to be maintained over long periods of times at a desired temperature for optimal drinking. Such device preferably should allow the beverage to be carried opened but safely without danger of spilling. The device should be small, attractive, reusable and fully adjustable.

SUMMARY OF THE INVENTION

The improved beverage temperature controller for a vehicle satisfies all the foregoing needs. The controller is substantially as set forth in the Abstract of the Disclosure.

Thus, the controller is a box-like hollow housing adapted to be releasably interconnected to the vent(s) of a vehicle air temperature conditioning unit; whether it be a heater or a combined heater and cooling unit. The housing has a closed bottom, sides, front and rear and an open top, with or without a lid, and defining a central beverage storage space. The housing rear has an opening adapted to fit over the vent(s) of an air temperature conditioning unit and be releasably connected thereto, as by velcro strips, one or more spring-biased hooks, etc. An adapter in the form of a sleeve can be interposed between and releasably connected to the housing and vent(s). Such adapter is used to position the housing for vertical holding of a beverage can, when the vent or vents are tilted at an angle, and to position the housing out in front of the vehicle dashboard top lid to provide clearance for inserting the beverage can into and removing it from the housing.

The housing can have an openable top lid and a front grill or opening to allow passage of air from the housing. A beverage container holder in the form of a horizontal plate with one or more vertical beverage can openings therein is positioned in the upper part of the housing. The openings are spaced from the housing sides, front and rear to allow air circulation around the cans. Strips connected to the upper surface of the bottom position the beverage cans above the bottom, also for improved air circulation thereraround. If desired, the can holder can be one or more rings held in place by struts, etc.

Beverage temperature in the can or cup while in the housing is easily controlled and maintained by regulating the temperature of the air exiting the vents of the air temperature conditioning unit and passing into the housing. For example, a can of soda, fruit juice or a bottle of water can easily be kept cold by the air temperature conditioning unit, since the air from the unit can be very low, e.g., 40-50 F. and will impinge directly on the can before it exits the top of the housing and/or the housing grill. Once the air circulates in the vehicle interior, it greatly increases in temperature toward ambient temperature. Since the air flow can be left on as long as desired, the drink will stay cold until fully consumed.

Similarly, the heating component of the air temperature conditioning unit will easily maintain a cup of coffee hot, since that air can be 100+°. Normally, cool drinks are consumed in warm weather and hot drinks in cold weather, so that the vehicle air temperature conditioning unit will be performing its normal cooling or warming function for the motorist(s) while keeping the beverage cool or hot. The housing also keeps the beverage safe against spilling and readily accessible to the driver and front passengers.

Various other aspects of the present invention are set forth in the following detailed description and accompanying drawings.

DRAWINGS

DETAILED DESCRIPTION

Figure 1:
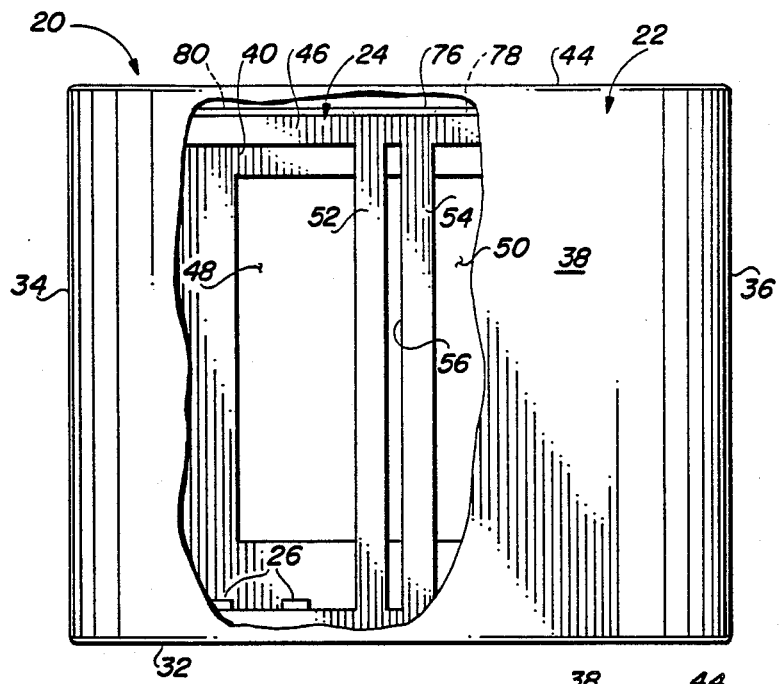
FIG. 1 is a schematic front elevation, partly broken away, of a first preferred embodiment of the improved beverage temperature controller of the present invention.
Figure 2:
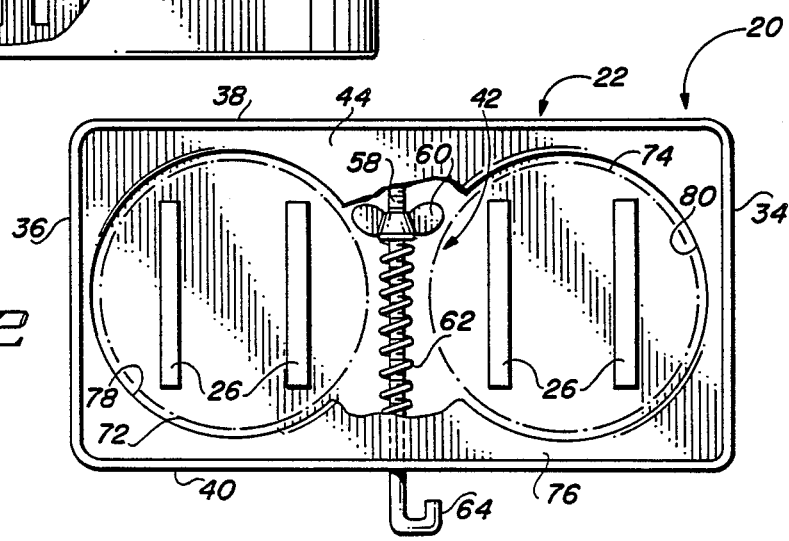
FIG. 2 is a schematic top plan view, partly broken away, of the controller of FIG. 1.

Figures 1-4.

Now referring more particularly to FIGS. 1-4 of the drawings, a first preferred embodiment of the improved beverage temperature controller of the present invention is schematically shown. Thus, controller 20 is depicted and comprises a hollow housing 22 having a beverage container holder 24 installed therein, with bottom spacers 26 in the bottom of housing 22 and with a pair of spring-loaded hooks 28 & 30 in and extending rearwardly of the housing 22.

Housing 22 is preferably generally rectangular and comprises a flat horizontal closed bottom 32, connected to vertical closed sides 34 & 36 and vertical closed front 38 and rear 40, collectively, defining a control storage space 42 and open top 44 communicating therewith. The interior perimeter of housing 22 may be provided with stiffening framing strips 46. Rear 40 has a pair of generally central openings 48 & 50 communicating with space 42 and separated from each other by a spaced pair of vertical posts 52 & 54 defining a central vertical slot 56 (FIG. 3) therebetween through which hooks 28 & 30 extend rearwardly (FIG. 4).

Hooks 28 & 30 each include a threaded shank 58, a wing nut 60 threaded on open end of shank 58 and a coil spring 62 abutting nut 60 and the interior surface of housing 22 at slot 56. The opposite end of shank 58 bears a curved open hook or loop 64.

Figure 3:
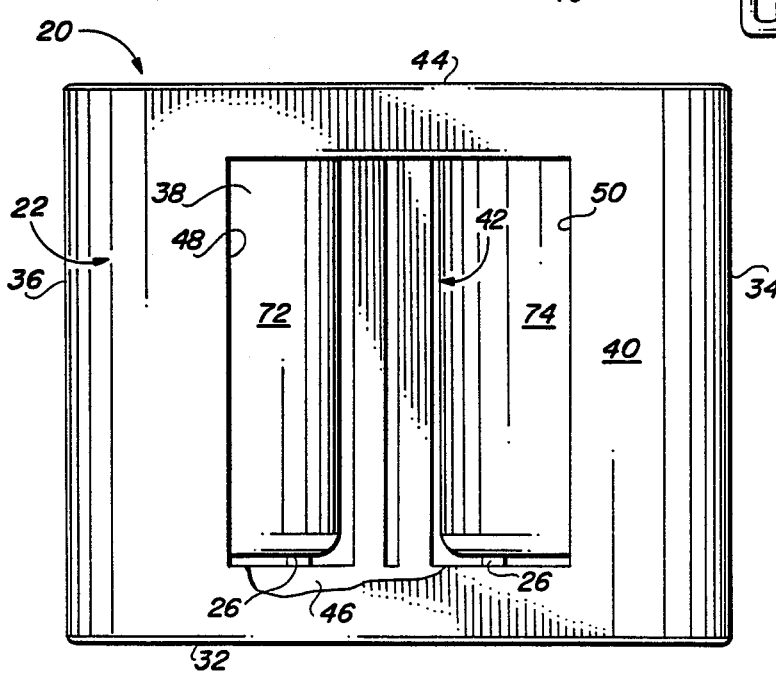
FIG. 3 is a schematic rear elevation of the controller of FIG. 1, without the spring-biased hooks thereof but with beverage cans therein.
Figure 4:
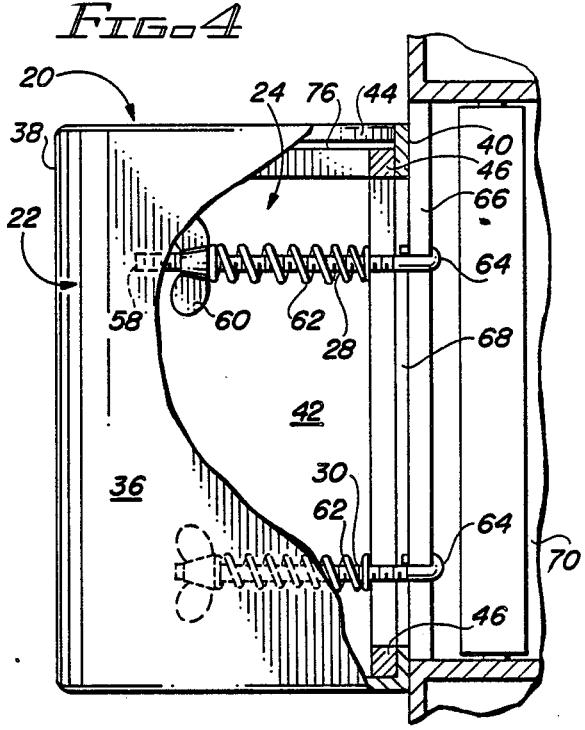
FIG. 4 is a schematic side elevation, partly broken away, of the controller of FIG. 1, shown connected to the air vents of a vehicle air temperature conditioning unit.

As can be seen in FIG. 4, loops 64 are releasably engageable with louvers 66 of the vent 68 of a vehicle air temperature conditioning unit 70 to hold rear end 40 of housing 22 tightly against vent 68 so that air from vent 68 passes directly through openings 48 & 50 into space 42 to cool or heat beverage cans 72 & 74 releasably disposed in space 42 (FIG. 3).

Cooled or heated air from vent 68 flows in a passageway around and under separated cans 72 & 74 to continuously cool or heat them to the desired temperature. Cans 72 & 74 are held securely in space 42 in holder 24 which comprises a horizontal plate 76 disposed on support frame 46 just below top 44 and bearing a spaced pair of round openings 78 & 80 extending vertically therethrough and separated from sides 34 & 36, front 38 and rear 40 to provide the necessary air flow passageway around cans 72 & 74 disposed in openings 78 & 80, respectively. Cans 72 & 74 are held securely therein, resting on bottom spacers 26 which facilitate air flow under cans 72 & 74, and cans 72 & 74 are easily withdrawn from housing 22 through top 44. Air after passing around and under cans 72 & 74 exits top 44 to cool or heat the vehicle interior. The cooling or heating effect on cans 72 & 74 can be easily controlled by unit 70, as desired. Such cooling or heating is continuous and maintains the beverage in cans 72 & 74 at the desired temperature until it is consumed.

In placing hooks 28 & 30 in position, it is usually desirable to first remove plate 76 from housing 22, then engage loops 64 with louvers 66 and tighten nut 60 against spring 62 to hold housing 22 in place against vent 68, after which plate 76 is repositioned on housing 22. Once housing 22 is installed by hooks 28 & 30, it can be left in place, with cans 72 & 74 inserted and removed at will, completely convenient to the vehicle driver and front passengers. Housing 22, can holder 24 and spacers 26 can be of plastic, wood, metal, or combinations thereof, or of other suitable material. Hooks 28 & 30 preferably are of metal or hard plastic. Controller 20 thus is simple, durable inexpensive and efficient.

Figure 5.

Figure 5:
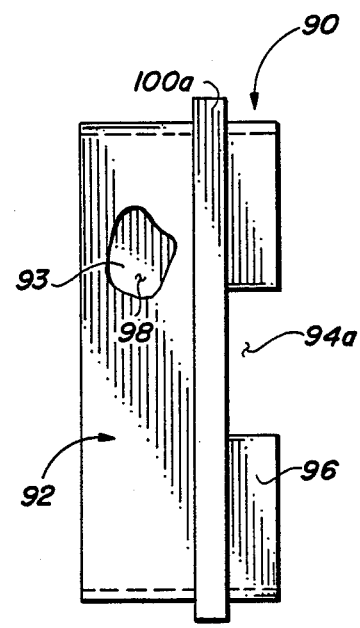
FIG. 5 is a schematic top plan view, partly broken away, of a first narrow adapter for the controller of FIG. 1

In FIG. 5 is shown an adapter 90 which comprises a hollow rectangular sleeve 92 with a central horizontal opening 93 extending therethrough and with a pair of vertical slots 94 in the top and bottom ends of sleeve 92, dimensioned to engage posts 52 & 54 while the front portion 96 of sleeve 92 slidingly slips into openings 48 & 50. Portion 96 is divided from rear portion 98 by a raised rim 100 which abuts rear end 40 of housing 22 when adapter 90 is fitted into housing 22.

Adapter 90 is releasably directly connectable to vent 68 by hooks 28 & 30, which pass forwardly through opening 93 to connect to vent 98 and hold adapter 90 tightly between vent 68 and housing 22. Adapter 90 is used to extend housing 22 rearward to a point where cans 72 & 74 will be rearward of the front lip of some vehicle dashboards (not shown) bearing vent 68, so that cans 72 & 74 can be readily inserted into housing 22 and removed therefrom. The position of housing 22 is convenient to the driver and front passengers, and cans 72 & 74 are held securely against spillage.

Figures 6 & 7.

Figure 6:
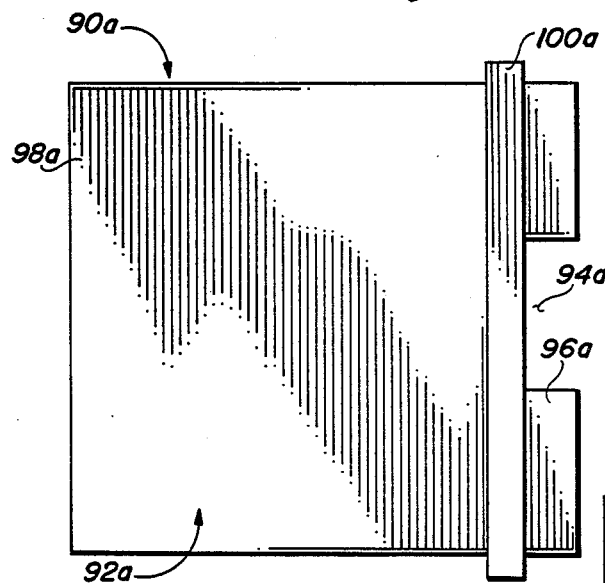
FIG. 6 is a schematic top plan view of a second elongated adapter for the controller of FIG. 1.
Figure 7:
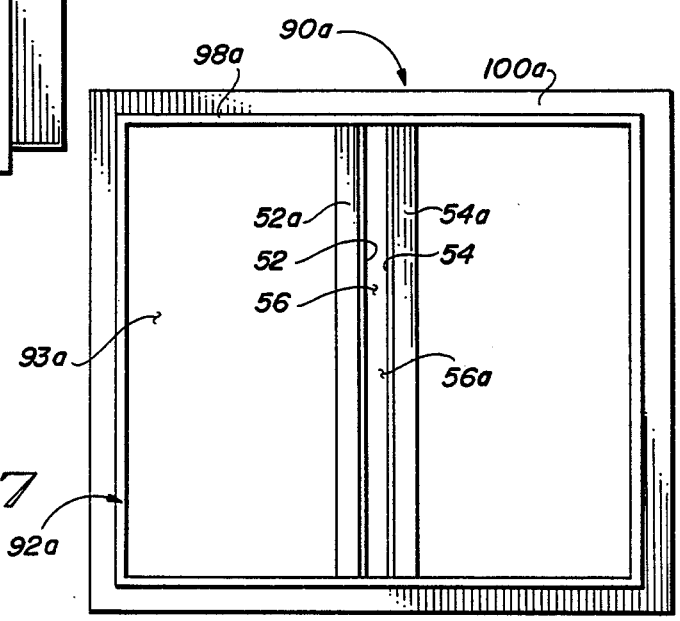
FIG. 7 is a schematic rear elevation of the adapter of FIG. 6.

Adapter 90a is shown in FIGS. 6 & 7. Components thereof similar to those of adapter 90 or housing 22 bear the same numerals but are succeeded by the letter "a". Adapter 90a is identical to adapter 90, except as follows:

a) adapter 90a is wider (in side elevation) than adapter 90 and thus will extend housing 22 further forward of vent 68 than would adapter 90; and, b) the open rear portion 98a is provided with a pair of spaced vertical posts 52a and 54a and defining a slot 56a therebetween through which one or more hooks (not shown) identical to hooks 28 & 30 can extend to connect adapter 90a to vent 68. Hooks 28 & 30 can then be used to connect housing 22 to adapter 90a. Alternatively, slot 56a can merely act as a guideway for an elongated version of hooks 28 & 30 extending all the way from housing 22 through adapter 90a to vent 68.

Figure 8.

Figure 8:
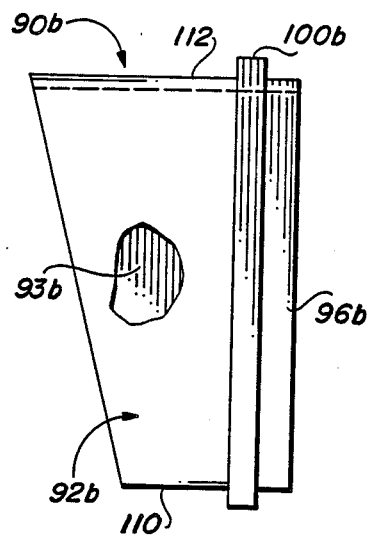
FIG. 8 is a schematic side elevation, partly broken away, of a third triangular shaped adapter for the controller of FIG. 1.

Adapter 90b is shown in FIG. 8. Components thereof similar to those of adapter 90 bear the same numerals but are succeeded by the letter "b". Adapter 90b is identical to adapter 90 except as follows:

adapter 90b is generally triangular (a truncated triangle) in side elevation, with the lower end 110 thereof shorter than the upper end 112 thereof so as to match the tilt of an upwardly sloped front vent 68 (not shown). Obviously, adapter 90b can be inverted, if desired, to match a vent with a reverse tilt.

Figure 9.

Figure 9:
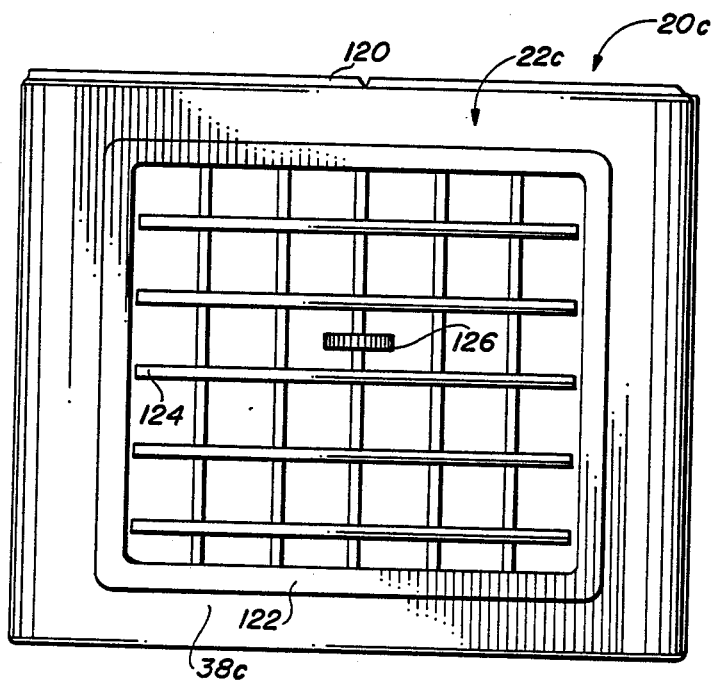
FIG. 9 is a schematic front elevation of a second preferred embodiment of the improved beverage temperature controller of the present invention; and, FIG. 10 is a schematic top plan view of a third preferred embodiment of the improved beverage temperature controller of the present invention.
Figure 10:
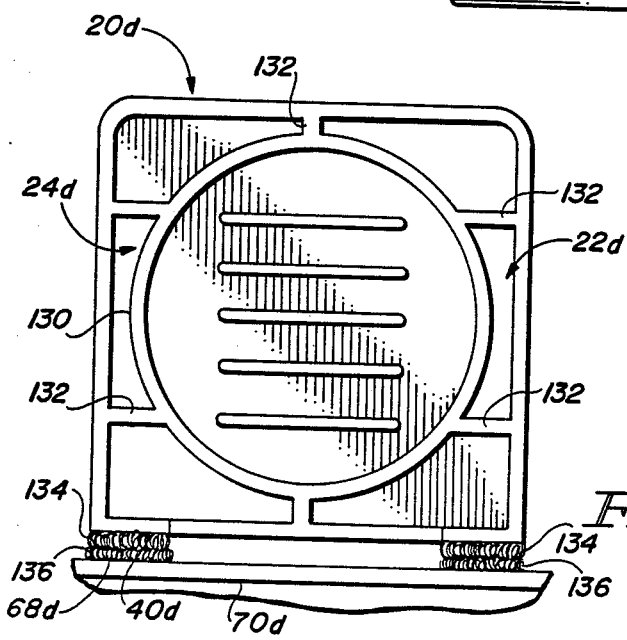

A second preferred embodiment of the improved controller of the present invention is schematically depicted in FIG. 9. Thus, controller 20c is shown. Components thereof similar to those of controller 20 bear the same numerals but are succeeded by the letter "c". Controller 20c is identical to controller 20, except as follows:

(a) housing 22c has a top lid 120 hinged thereto; and, (b) front 38c of housing 22c has an air grill 122 of conventional design which may be fixed or, as shown, may contain louvers 124 movable by operation of a covnentional turn knob 126.

Thus, air otherwise trapped in housing 22c by lid 120 exits housing 22c through front grill 122, preferably in a direction controlled by louvers 124 and knob 126.

Figure 10.

A third preferred embodiment of the improved controller of the present invention is schematically depicted in FIG. 9. Thus, controller 20d is shown. Components thereof similar to those of controller 20 bear the same numerals but are succeeded by the letter "d". Controller 20d is identical to controller 20 except as follows:

(a) can holder 24d comprises a single ring 130 supported by struts 132 attached to the inner surfaces of housing 22d, so that housing 22d can hold only one beverage can; and, (b) velcro strips 134 on the rear 40d releasably connect housing 22d to velcro strips 136 on front vent 68d of air temperature conditioning unit 70d.

Controllers 20c and 20d have substantially the advantages of controller 20.

Various other modifications, changes, alterations and additions can be made in the improved controller of the present invention, its components and parameters. All such modifications, changes, alterations and additions as are within the scope of the appended claims form part of the present invention.

What is claimed is:

1. An improved beverage temperature controller for a vehicle, said controller comprising, in combination:
   (a) a hollow housing having a closed generally horizontal bottom and interconnected closed upraised sides, front and rear, defining collectively a central beverage storage space and an open top with access to said space, said housing rear having an opening providing access to said storage space;
   (b) a beverage container holder in said housing storage space having a vertical beverage container opening therein spaced from said sides, front and rear to provide a circulation pathway around a beverage container when in said holder;
   (c) bottom spacers disposed on the upper surface of said housing bottom to separate a beverage container, when in said holder, from said bottom for improved air circulation around said beverage container; and,
   (d) housing connector means secured to said housing rear and adapted to releasably interconnect said rear to a vehicle air temperature conditioning unit, with said rear opening over a vent of said air temperature conditioning unit,
   (e) wherein said holder comprises a ring disposed between and secured by struts to said housing sides and/or rear and front.

2. An improved beverage temperature controller for a vehicle, said controller, comprising, in combination:
   (a) a hollow housing having a closed generally horizontal bottom and interconnected closed upraised sides, front and rear, defining collectively a central beverage storage space and an open top with access to said space, said housing rear having an opening providing access to said storage space;
   (b) a beverage container holder in said housing storage space having a vertical beverage container opening therein spaced from said sides, front and rear to provide a circulation pathway around a beverage container when in said holder;
   (c) bottom spacers disposed on the upper surface of said housing bottom to separate a beverage container, when in said holder, from said bottom for improved air circulation around said beverage container; and,
   (d) housing connector means secured to said housing rear and adapted to releasably interconnect said rear to a vehicle air temperature conditioning unit, with said rear opening over a vent of said air temperature conditioning unit,
   (e) wherein said connector means comprises at least one spring biased hook extending through said housing rear and adapted to be hooked around an air temperature conditioning vent or vent housing, and
   (f) wherein said holder comprises a ring disposed between and secured by struts to said housing sides and/or rear and front.

3. The improved controller of claim 2 wherein said rear housing opening bears a vertical slot defined by a spaced pair of vertical posts and wherein a spaced pair of said hooks extend through said slot for engagement with vent louvers of said air temperature conditioning unit.

4. The improved controller of claim 2 wherein said housing rear bears spaced strips of velcro material engageable with matching velcro strips on the vent of said air temperature conditioning unit.

5. The improved controller of claim 2 wherein said controller includes an adapter comprising a sleeve having closed sides, bottom and top and an open front and rear releasably connectable to said housing rear at said housing rear opening and bearing an air passageway extending therethrough from said adapter front to said adapter rear, said adapter being connectable to the vent of an air temperature conditioning unit and spacing said housing sufficiently therefrom to facilitate removal and insertion of a beverage container in said housing without interference from a vehicle dashboard.

6. The improved controller of claim 5 wherein said adapter is slideably receivable in said housing rear opening and wherein said housing connector means extends rearwardly through said adapter for connection to said vent of said air temperature conditioning unit.

7. The improved controller of claim 5 wherein said adapter is generally triangular in side elevation so as to tilt said housing into a vertical orientation when connected to a non-vertical vent of said air temperature conditioning unit.

8. The improved controller of claim 5 wherein said adapter includes separate connector means for releasably interconnecting said adapter to said air temperature conditioning unit and wherein said housing connector means releasably connect said adapter to said housing.

9. The improved controller of claim 2 wherein said housing front includes a grill for passage of air from said housing and wherein said top is releasably covered by a lid.

* * * * *